United States Patent [19]

Patton et al.

[11] Patent Number: 5,739,896
[45] Date of Patent: Apr. 14, 1998

[54] METHOD AND APPARATUS FOR DIGITALLY PRINTING AND DEVELOPING IMAGES ONTO PHOTOSENSITIVE MATERIAL

[75] Inventors: David Lynn Patton, Webster; Roy Bernard Ference, Fairport; Douglas Harold Smith, Spencerport; John Howard Rosenburgh, Hilton, all of N.Y.

[73] Assignee: Eastman Kodak Company, Rochester, N.Y.

[21] Appl. No.: 383,283

[22] Filed: Feb. 3, 1995

[51] Int. Cl.⁶ ............................. G03B 27/32; H04N 1/21
[52] U.S. Cl. .................................. 355/27; 358/302
[58] Field of Search ................ 355/27, 30; 354/297, 354/298, 299; 358/302

[56] References Cited

U.S. PATENT DOCUMENTS

| | | | |
|---|---|---|---|
| 3,372,630 | 3/1968 | Schmidt | 354/299 X |
| 3,475,093 | 10/1969 | Mazzio et al. | 355/3 |
| 3,922,701 | 11/1975 | Geyken et al. | 354/299 |
| 3,927,417 | 12/1975 | Kinoshita et al. | 354/298 |
| 4,086,607 | 4/1978 | Muller | 354/299 |
| 4,192,594 | 3/1980 | Oidaira et al. | 354/90 |
| 4,310,234 | 1/1982 | Sakamato et al. | 354/298 |
| 4,486,082 | 12/1984 | Wagner et al. | 354/6 |
| 4,698,647 | 10/1987 | Gerlach | 358/302 X |
| 4,716,285 | 12/1987 | Konishi | 250/205 |
| 4,723,151 | 2/1988 | Sonezaki et al. | 355/27 |
| 4,745,423 | 5/1988 | Uchida | 354/320 |
| 4,757,334 | 7/1988 | Volent | 354/76 |
| 4,774,547 | 9/1988 | Uchida et al. | 355/27 |
| 4,791,444 | 12/1988 | Hiroshi et al. | |
| 4,881,095 | 11/1989 | Shidara | 354/298 |
| 5,070,351 | 12/1991 | Vanover et al. | 354/299 |
| 5,146,257 | 9/1992 | Lemberger et al. | 354/298 |
| 5,179,404 | 1/1993 | Bartell et al. | 354/320 |
| 5,270,762 | 12/1993 | Rosenburgh et al. | 354/324 |
| 5,294,022 | 3/1994 | Earle | 222/56 |
| 5,294,956 | 3/1994 | Earle | 354/324 |
| 5,309,191 | 5/1994 | Bartell et al. | 354/299 |
| 5,311,235 | 5/1994 | Piccinino, Jr. et al. | 354/320 |
| 5,313,243 | 5/1994 | Rosenburgh et al. | 354/324 |
| 5,319,410 | 6/1994 | Glover et al. | 354/324 |
| 5,323,202 | 6/1994 | Glover | 354/321 |
| 5,339,131 | 8/1994 | Rosenburgh et al. | 354/324 |
| 5,347,337 | 9/1994 | Patton et al. | 354/324 |
| 5,351,104 | 9/1994 | Glover et al. | 354/328 |
| 5,353,083 | 10/1994 | Rosenburgh et al. | 354/319 |
| 5,353,086 | 10/1994 | Piccinino, Jr. et al. | 354/324 |
| 5,353,087 | 10/1994 | Rosenburgh et al. | 354/324 |
| 5,353,088 | 10/1994 | Rosenburgh et al. | 354/324 |
| 5,355,190 | 10/1994 | Rosenburgh et al. | 354/324 |
| 5,361,114 | 11/1994 | Earle | 354/320 |
| 5,381,203 | 1/1995 | Piccinino, Jr. et al. | 354/324 |
| 5,382,995 | 1/1995 | Glover et al. | 354/331 |
| 5,386,261 | 1/1995 | Patton et al. | 354/324 |
| 5,387,499 | 2/1995 | Earle et al. | |
| 5,389,994 | 2/1995 | Rosenburgh et al. | 354/324 |

FOREIGN PATENT DOCUMENTS

| | | |
|---|---|---|
| 0 321 143 | 6/1989 | European Pat. Off. |
| 0 615 154 | 9/1994 | European Pat. Off. |
| 0 623 841 A | 11/1994 | European Pat. Off. |
| 2-100050 A | 4/1990 | Japan |
| 5-289299 A | 11/1993 | Japan |
| 91/12567 | 8/1991 | WIPO |

OTHER PUBLICATIONS

JP5014655, Patent Abstracts of Japan, vol. 17, No. 287, (E-1374), Brother Ind. Ltd., "Picture Recorder".
JP6141166, Patent Abstracts of Japan, vol. 18, No. 447, (E-1594), Ricoh Co. Ltd., "Digital Copying Machine".

*Primary Examiner*—Fred L. Braun
*Attorney, Agent, or Firm*—Frank Pincelli

[57] ABSTRACT

A method and apparatus for printing and processing a color image onto photosensitive material. The apparatus includes a digital color printer, such as an LED, for printing an image onto a photographic material and a low volume thin tank processing section for processing the photosensitive material that has passed through the digital printer.

24 Claims, 9 Drawing Sheets

METHOD AND APPARATUS FOR DIGITALLY PRINTING AND DEVELOPING IMAGES ONTO PHOTOSENSITIVE MATERIAL

FIELD OF THE INVENTION

The present invention relates to the field of digital printing and processing of a photosensitive material.

BACKGROUND OF THE INVENTION

Conventional photographic processors that develop digital silver halide images require a significant amount of square footage of sensitized material to be processed within a specified time interval. This is required so as to ensure fresh chemistry is introduced into the processor to replace solutions used to process the photosensitive material. More particularly, to supply fresh chemistry to replace the solution that has lost its potency due to aging. In typical prior art silver halide digital printers, the number of images being processed is less than the number processed in conventional optical printing processors. This is principally due to the fact that it takes longer to produce a digital black and white image because of the techniques employed to obtain the image. It can take substantially longer to produce a color image as opposed to a black and white image with a digital printer.

Another problem experienced in prior art printers and processors is that such printers and processors, when used to print large formats such as 20"×30" or 30"×40" prints, require a significant amount of space. In typical prior art digital printers, the photosensitive material is printed while in a flat configuration.

There has been suggested in the prior art the coupling together of a digital laser printer with a conventional processor as illustrated in U.S. Pat. No. 4,723,151. However, this reference is directed to the processing of x-ray film as opposed to color silver halide photosensitive material. Further, in order to write a color image onto a conventional photosensitive material using a laser technique would require a complex three-channel laser system. Thus, it would not be desirable to use the laser technique disclosed in the '151 patent as it would make it even more difficult to control the chemistry. Furthermore, a color processor requires more processing steps than a conventional black and white processor and thus increases the number of processing solution that must be controlled. Additionally, the laser printing technique disclosed therein would be extremely expensive and difficult to use in exposing color silver halide photosensitive material.

Applicants have invented a unique digital printing and processing apparatus which solves the problems existing in prior art devices. In particular, the present invention provides a compact printing and processing apparatus wherein low volume utilization of photosensitive material can be provided without any significant effect to the chemistry therein. The apparatus can accommodate large sized prints and a wide variation in different widths and lengths of photosensitive materials while requiring a relatively small area. Additionally, a processing apparatus made in accordance with the present invention is relatively inexpensive, reliable, and produces high quality color images on photosensitive material.

SUMMARY OF THE INVENTION

In one aspect of the present invention there is provided a digital color printing and processing apparatus. The apparatus includes a digital color printer for printing an image onto a photosensitive material and a developing section for processing the photosensitive material that has been passed through the digital printer. The developing section has a low volume thin channel processor for processing the photosensitive material.

In an another aspect of the present invention there is provided a method of printing and processing a color photosensitive material in a printing and processing apparatus having a digital printer for printing an image onto the photosensitive material and a processor for processing photosensitive material. The processor comprises a low volume thin chamber/channel through which the photosensitive material is passed for processing. The printer has a continuous supply roll of photosensitive material for providing photosensitive material in the printing section for digital printing of an image thereon. The method comprises the steps of:

a) writing at least one image on the photosensitive material by the printer; and b) processing the photosensitive material in the processing section.

The invention and its objects and advantages will become more apparent in the detailed description of the preferred embodiment presented below.

DESCRIPTION OF THE DRAWINGS

In the detailed description of the preferred embodiment presented below, reference is made to the accompanied drawings in which.

DETAILED DESCRIPTION

Figure 1:
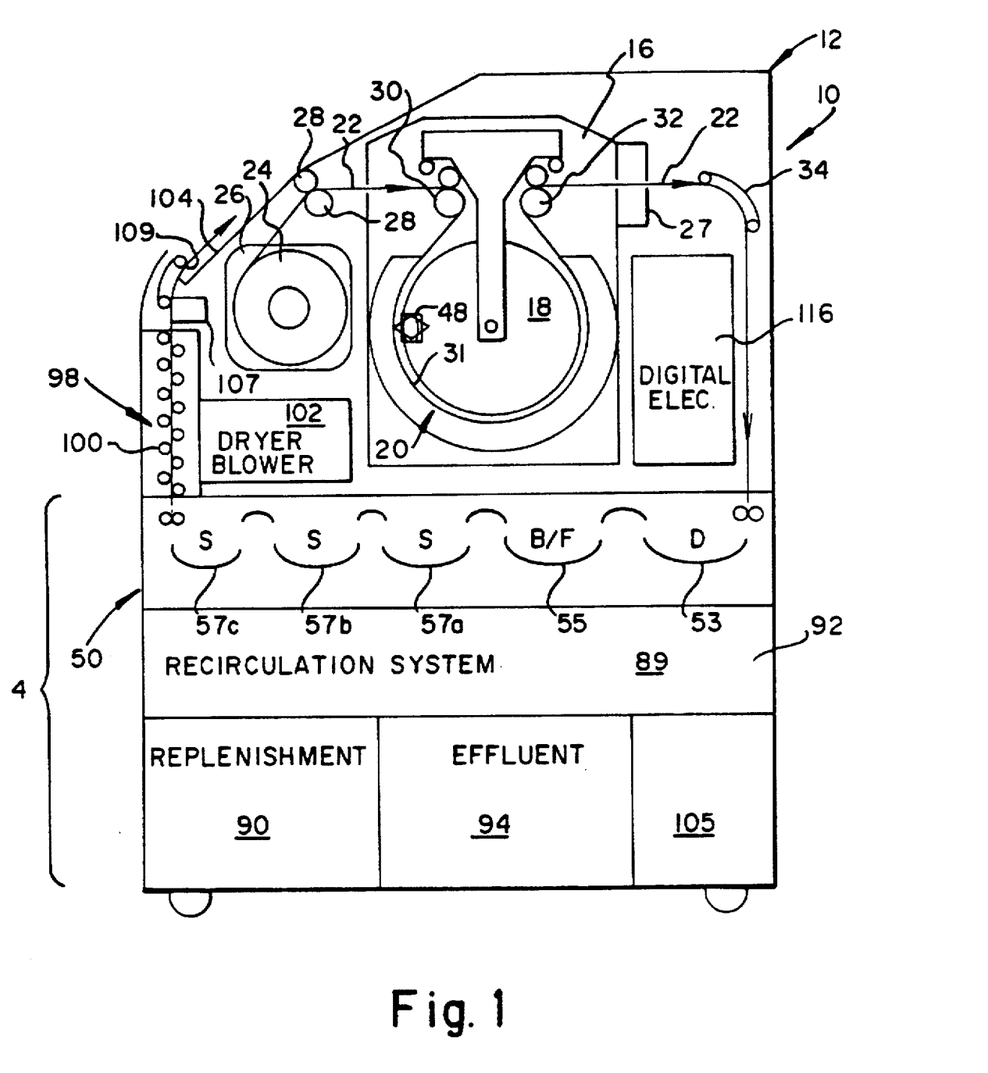
FIG. 1 is a vertical cross-section of a printing and processing apparatus made in accordance with the present invention.
Figure 2:
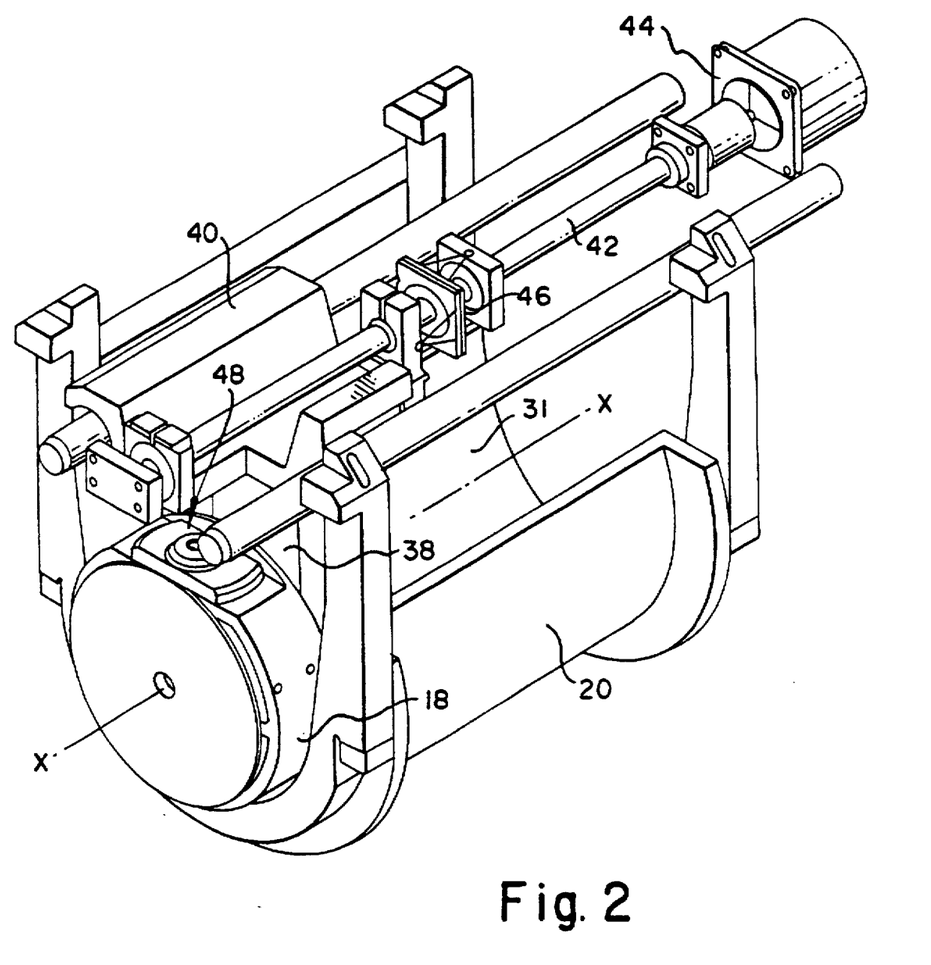
FIG. 2 is an enlarged perspective view of the rotary printing system utilized in the printer section of the apparatus of FIG. 1.

Referring to FIGS. 1 and 2, there is illustrated a printing and developing apparatus 10 made in accordance with the present invention. The apparatus 10 comprises a printing section 12 disposed above a developing section 14. In the printing section 12 a digital image is written onto photosensitive material, and in developing section 14 the photosensitive material is developed such that when the print leaves the apparatus 10, a fully developed image is formed thereon.

The printing section 12 preferably comprises an LED printing system such as described in copending application entitled "Method and Apparatus for Exposing Photosensitive Media with Multiple Light Sources", of Douglas H. Smith, John F. Carson, Roy F. Ference, and Karen J. Appel, U.S. Ser. No. 08/123,839, filed Sep. 20, 1993, and which is hereby incorporated by reference. In particular, the printing section 12 includes a rotary print system 16 which employs a digital multi-beam color exposure system, which is illustrated in greater detail in FIGS. 2 and 3. In particular, the printing system 16 includes a rotor 18 which is coupled to a drive motor (not shown) for rotating of the rotor 18 about longitudinal axis x—x. The rotor 18 is arranged to spin and move axially within a stationary cylindrical print shoe 20 which is provided with a sheet of photosensitive material 22. In the particular embodiment illustrated, the photosensitive material 22 is provided in a continuous roll 24 contained in a magazine 26 and is cut to the desired length by cutter 27 disposed after shoe 20. A pair of guide rollers 28 is provided for guiding and driving of the photosensitive material 22 into the rotary print system. A pair of guide rollers 30 is provided in the print system 16 for guiding the photosensitive material to shoe 20. The photosensitive material 22 is wrapped on the inner surface 31 of the shoe 20. An another pair of guide rollers 32 is provided for guiding the photosensitive sheet of material out of the shoe 20. The photosensitive material is guided in the direction of the developing section 14 by guide 34. In order to maintain the photosensitive material against the inner surface 31 of shoe 20, an appropriate vacuum system (not shown) is provided such that the photosensitive material 22 is securely and firmly held against the shoe for allowing writing of the image by rotor 18. Typically, this includes the providing of a plurality of small holes on the inner surface 31 of the shoe which is connected to a vacuum source. The vacuum source is turned on when the photosensitive material is in the printing position in the shoe 20 for printing and is turned off when the sheet is being transported into or out of the shoe.

The rotor 18 is simultaneously rotated about axis x—x in a fast scan direction and is translated along the longitudinal axis x—x of the shoe 20. Rotor 18 is attached to a linear translation assembly comprising a pedestal structure 38, a translator base 40, and a leadscrew 42 driven by a stepper motor 44, with the leadscrew 42 being connected to the translator base by a coupler 46. A suitable coupler is described in further detail in copending application entitled "Leadscrew Coupler", of Bradley S. Jadrich and Mark E. Bridges, U.S. Ser. No. 08/123,838, filed January 28, 1992, and which is also hereby incorporated by reference. The rotor 18 is simultaneously rotated by drive motor (not shown) in a fast scan direction and is translated past the stationary print shoe 20 in a slow scan actual direction x—x about by stepper motor 44, leadscrew 42, and coupling 46, thereby achieving a raster scan pattern on the photosensitive material being held within the shoe 20.

Figure 3:
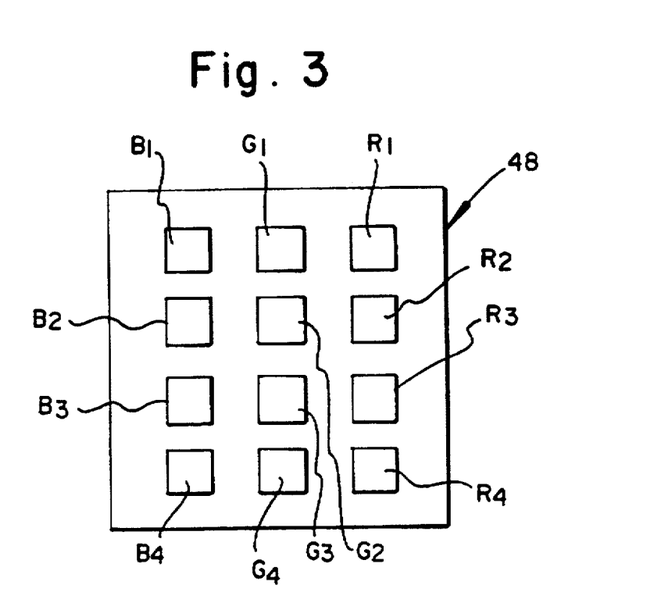
FIG. 3 is an enlarged schematic plan view of an LED array used in the printing system illustrated in FIG. 2.

An LED printhead assembly 48 is mounted in the rotor 18 and comprises a plurality of mono-colored light sources, such as an array of LEDs 48 (see FIG. 3). The printhead assembly 48 is located within the body of the rotor 18, as illustrated in FIG. 1, with the LED array package positioned so that the LED aperture output surface is located in a plane which is perpendicular to the optical axis of the projection lens assembly (not shown) for imaging onto the photosensitive material. The projection lens assembly is used to simultaneously image or focus all the LEDs onto a surface located in close proximity above the outer surface of the rotor, and more particularly, onto the surface of the photosensitive material 22 held by the shoe 20. A single lens thereby images or focuses the plurality of LEDs onto the photosensitive material 22 as a plurality of individual images which constitute the writing beam that exposes the image pixels.

The LED array is arranged to provide a continuous-tone, full color image from a digital input signal. In the embodiment illustrated, the LED head assembly 48 (see FIG. 3) comprises three columns of four LEDs; with each column comprised of a single color, with at least one of the rows having different colors than the other rows, and preferably, with one row each having one of red, green, and blue LEDs, respectively. The red LEDs are identified as $R_1$, $R_2$, $R_3$, and $R_4$; the green LEDs are identified as $G_1$, $G_2$, $G_3$, and $G_4$; and the blue LEDs are identified as $B_1$, $B_2$, $B_3$, and $B_4$. The LED array is operated such that the desired color images are formed on the photosensitive material.

Figure 4:
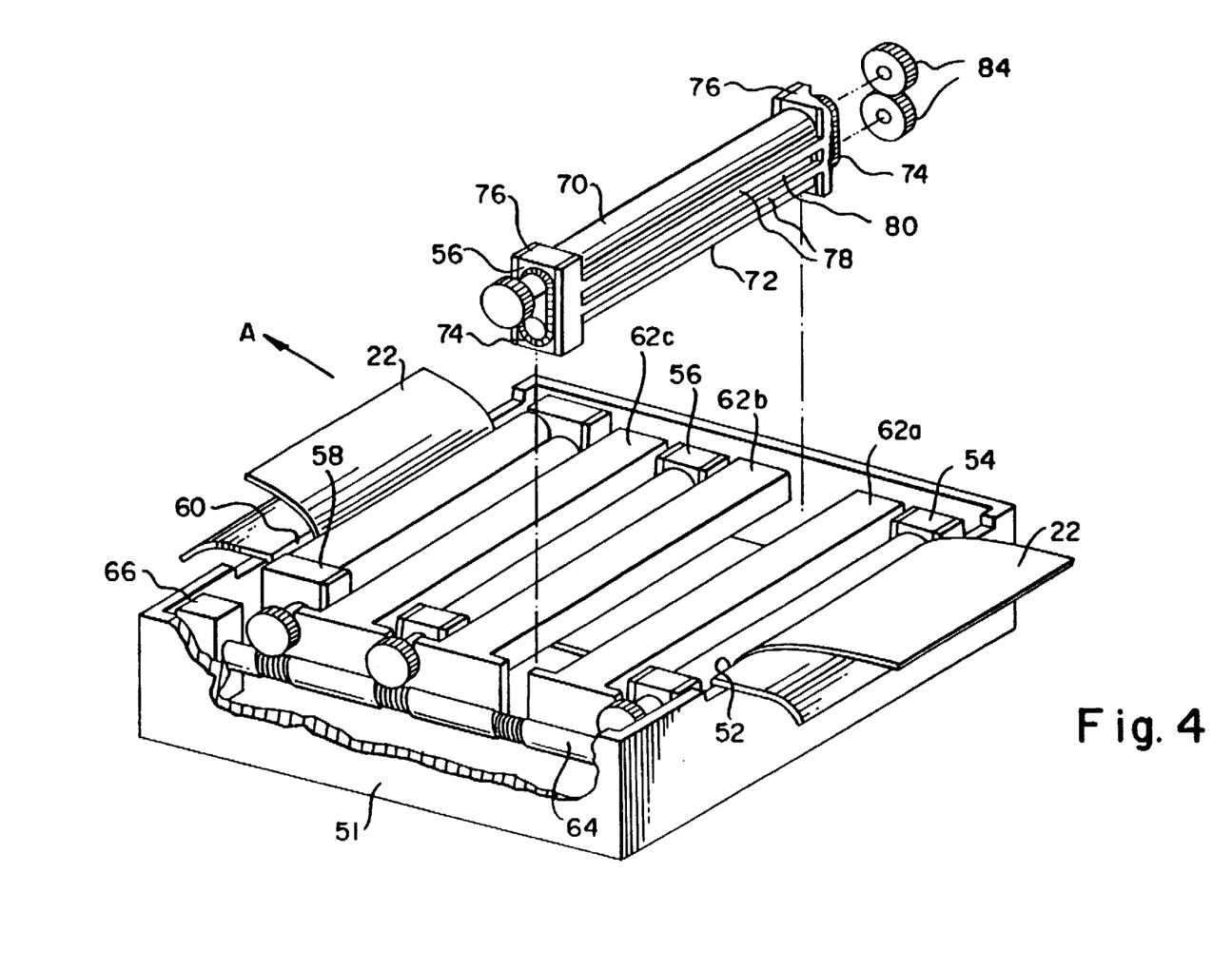
FIG. 4 is an enlarged perspective view of a portion of the processing section illustrating the path of the photosensitive material through the processing sections containing the processing solutions.
Figure 5:
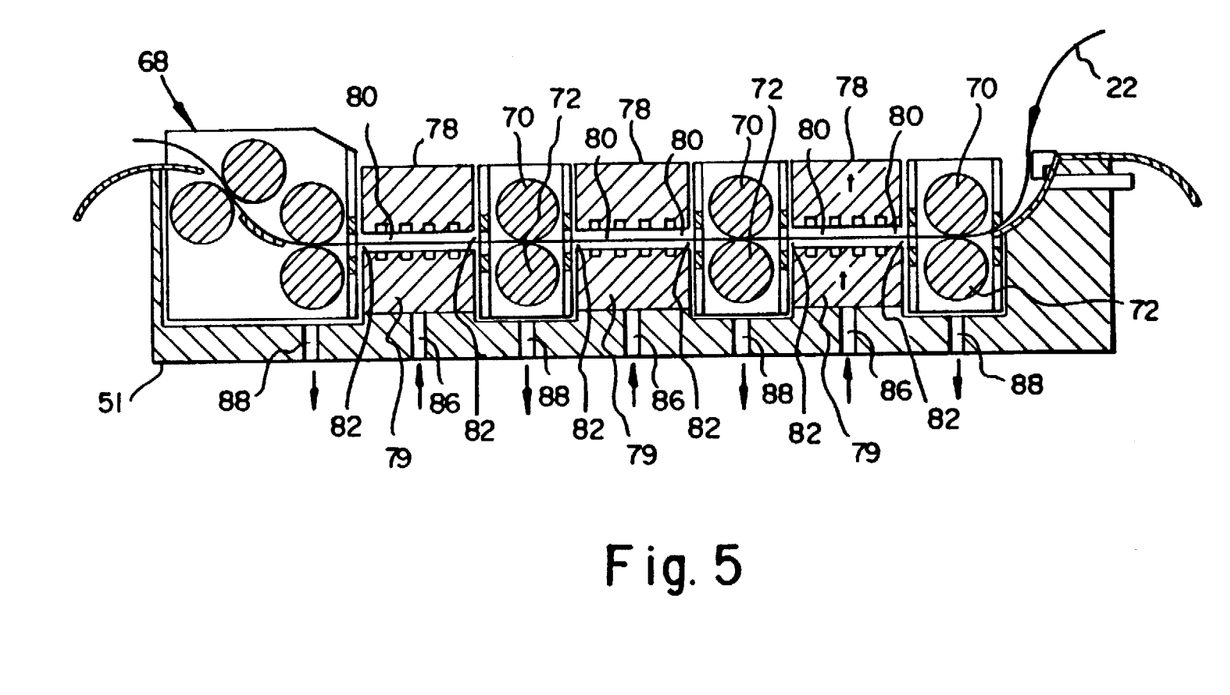
FIG. 5 is a partial cut-away drawing of a portion of the developing portion of FIG. 5 as taken along line 5—5.

Once the photosensitive material obtained has been exposed with the desired image, the photosensitive material is passed on to the developing section 14 where it is developed. Referring to FIGS. 4 and 5, there is illustrated in greater detail the processing section 50 of the developing section 14. The processing section 50 (as shown in FIG. 1) comprises a plurality of processing modules 53,55,57a,57b, 57c wherein a processing step occurs at each module. In the particular embodiment illustrated, the photosensitive material is subjected to a developing solution at module 53, a bleach fixing solution at module 55, and a stabilizer solution at modules 57a,57b,57c. Each of the processing modules 53,55,57a,57b,57c utilizes a low volume thin channel/tank processing system. In particular, the processing modules 53,55,57a,57b,57c each include a container 51 (see FIG. 4); an upturned entrance channel 52; an entry transport roller assembly 54; at least one transport roller assembly 56; an exit transport roller assembly 58; an upturned exit channel 60; high impingement slot nozzle assemblies 62a,62b,62c; a drive 64; and a rotating assembly 66. Assembly 66 may be any known means for turning drive 64, i.e. a motor, a gear, a belt, a chain, etc. Assemblies 54,56,58 are positioned within the container 51 in the vicinity of the walls of the container and slot nozzle assemblies 62a,62b,62c are positioned within the vicinity of the walls of the container. Drive 64 is connected to roller assemblies 54,56,58. Turning assembly 66 and drive 64 are used to transmit the motion of assembly 66 to assemblies 54,56,58. Roller assemblies 54,56,58 and slot nozzle assemblies 62a,62b,62c may be easily inserted or removed from the container 51. Transport roller assembly 56 includes a top roller 70; a bottom roller 72; tension springs 74, which holds top roller 70 in compression with respect to bottom roller 72; a bearing bracket 76; and slot nozzle assemblies 62a,62b,62c, each having a top channel section 78 and bottom channel section 79, which forms a thin low volume processing channel 80 through which the photosensitive material passes. The channel 80 in each nozzle assembly has openings 82 at either end for allowing processing solution to leave channel 80 and the photosensitive material 22 to pass through channel 80. A discharge opening (not shown), preferably in the form an elongated slot, is provided in the top and/or bottom channel sections 78,79 for allowing the processing solution supplied to each of the slot nozzle assemblies to be delivered to its respective processing channel. Rollers 70,72 may be drive or driven rollers and rollers 70,72 are connected to bearing bracket 76. Rollers 70,72 are rotated by intermeshing gears 84. In the particular embodiment illustrated, the photosensitive material 22 is transported in a direction "A" automatically through processing channel 80 by roller assemblies 54,56,58. Cross-over assembly 68 is provided for assisting transporting the photosensitive material to the next adjacent processing module or processing step.

Referring in particular to FIG. 5, there is illustrated a partial cut-away section of a processing module which illustrates the openings 86 provided for supplying photosensitive processing solution from the recirculation system 89 (see FIG. 1), as indicated by the arrows adjacent thereto, to the processing channel sections 78,79 for delivery of the processing solution to the processing channel 80. Exit passages 88 are provided for returning processing solution to the recirculation system 89. The recirculation system 89 includes separate means for recirculating the processing solution to each of the processing modules. Appropriate plumbing and connections (not shown) are also provided for connecting the replenishment section 90 to the recirculation system 89.

Overflow effluent from the modules is passed onto effluent section 94, by appropriate plumbing, for proper retention or disposal. After the photosensitive material is passed through the processing section 50, it is then passed onto drying section 98, which includes a dryer 100 and dryer blower 102. After drying, the photosensitive material is passed onto a receiving tray 104.

Further details as to the operation and construction of a suitable processing section 50 for use in the present invention may be found in U.S. Pat. Nos. 5,381,203; 5,353,088; 5,313,243; 5,347,337; 5,386,261; 5,353,086; 5,353,087; 5,353,083; 5,389,994; 5,355,190, which are hereby incorporated by reference herein. Additionally, other type low volume thin tank processors may be employed as is shown and described in U.S. Pat. Nos. 5,361,114; 5,387,499; 5,319, 410; 5,382,995; 5,351,104; 5,323,202; 5,294,956; 5,311, 235; 5,179,404; 5,270,762; 5,309,191; 5,339,131; and copending application entitled "A Rack and a Tank for a Photographic Processing Apparatus", of David L. Patton, Roger E. Bartell, John H. Rosenburgh, and Ralph L. Piccinino, Jr., U.S. Ser. No. 08/309,212, filed Sep. 20, 1994, all of the foregoing references are also incorporated herein by reference.

The processing section 50, as previously discussed, is designed to be of the low volume type so that the processing solutions contained in each module will not age and, thus, will be used more efficiently. In particular, each processing module provides a small volume for holding processing solution in channel 80. As a part of limiting the volume of the processing solution, processing channel 80 should have a thickness t preferably equal to or less than about 50 times the thickness of the photosensitive material being processed, preferably the thickness t is equal to or less than about 10 times the paper thickness. In a processor for processing photographic paper, the thickness t of the processing channel 80 should be equal to or less than about 50 times the thickness of the paper being processed. Preferably, thickness t is equal to or less than about 10 times the paper thickness. An example of a processor made in accordance with the present invention, which processes paper having a thickness of about 0.008", would have a channel thickness t of about 0.08", and a processor which processes film having a thickness of about 0.005" would have a channel thickness t of about 0.10".

The total volume of the processing solution within the processing channel 80 and recirculation system 89 for each module is relatively small as compared to prior art processors. In particular, the total amount of processing solution in the entire processing system for each of the modules is such that the total volume of the available channel 80 for holding processing solution is at least 40% of the total volume of processing solution available within the processing module and recirculation system. Preferably, the volume of processing channel 80 is at least 50% of the total volume of the processing solution in the system. In the particular embodiment illustrated, the volume of the processing channel is about 60% of the total volume of the available processing solution.

Typically, the amount of processing solution available in the system will vary on the size of the processor, that is, the amount of photosensitive material the processor is capable of processing, for example, a typical prior art microlab processor (a processor that processes up to about 5 ft$^2$/min. of photosensitive material) which generally has a transport speed of less than about 50 in/min. (has about 17 liters of processing solution as compared to about 5 liters for a processor made in accordance with the present invention). With respect to prior art minilabs, a processor that processes from about 5 ft$^2$/min. to about 15 ft$^2$/min. of photosensitive material (which generally has a transport speed from about 50 in/min. to about 120 in/min.) has about 100 liters of processing solution as compared to about 10 liters of processing solution for the developing section of an apparatus made in accordance with the present invention. In an apparatus made in accordance with the present invention having a minilab size developing section 14 (designed to process 15 ft$^2$/min. of photosensitive material per minute), there would be approximately 7 liters of processing solution as compared to 17 liters for typical prior art converted tank-type processors.

With respect to large prior art lab processors that process up to 50 ft$^2$/min. of photosensitive material (which generally have transport speeds of about 7 to 60 ft/min.) typically have from about 150 to 300 liters of processing solution as compared to a range of about 15 to 100 liters for an apparatus made in accordance with the present invention.

In order to provide efficient flow of processing solution through the nozzle assemblies into the processing channel 80, it is desirable that the discharge opening or openings in each of the slot nozzle assemblies that delivers processing solution to the processing channel have a configuration in accordance with the following relationship:

$$1 \leq F/A \leq 40$$

wherein:
F is the flow rate of the solution through the nozzle in gallons per minute; and
A is the cross-sectional area of the nozzle provided in square inches.

Providing a slot nozzle assembly in accordance with the foregoing relationship assures appropriate discharge of the processing solution against the photosensitive material.

In the present invention the photosensitive material is preferably provided on a roll. This allows the production of various size prints. The length of the print may be any desired length which is limited by the length of the roll. The width of the images is limited by the width of the roll. Since the present invention employs a digital printer, a plurality of images may be placed in any format and various combinations on the photosensitive material in order to better utilize the photosensitive material being processed and thereby minimize waste of photosensitive material processed through the device. Further, text and/or graphics can be added to the image to be printed. This additional text and/or graphics can be prestored in CPU 110 or can be added through CPU 110 (see FIG. 6).

The use of the shoe and rotating rotor into the printing section and the horizontal thin processing channel allows the use of a wide variety of different size photosensitive materials in the apparatus, thereby minimizing cost and/or any change-overs required to print different size photosensitive materials. Additionally, the structure of the present invention provides for a compact printer processor which does not take up very much room, and thus can be accommodated much more easily at a variety of commercial locations.

An optional densitometer 107 may be provide adjacent the dryer exit and before the exit port 109 of the apparatus (see FIG. 1). The densitometer 107 may be placed at any other convenient place after the development module. The densitometer 107 can be used to self-calibrate both the printing and processing section of the apparatus. Since the printer is digital, prestored calibration exposures can be stored in memory of the printer control computer (CPU) 116 of the apparatus 10. The calibration exposures can be printed when it is desired to check the operation of the apparatus 10. This can be done manually or automatically after a predetermined time period has passed or a certain number of images or photosensitive material has been processed. The densitometer 107 can be used to measure the calibration exposure printed and developed, the results of which can be passed on to control computer 106 (such as a CPU) used to run and operate the developing section of apparatus 10. The results can thus be analyzed and appropriate action taken by the apparatus to correct any inaccuracies, for example, used to readjust the replenishment rate of the replenishment solutions to the processor. Also, since the amount of exposure in the printer is known, this information can be used to control the amount of replenishment supplied to the module. The results could also be used to take corrective action in the printer in response to the aging of the LEDs. It is, of course, understood that any other desired or appropriate corrective action may also be taken. This feature would be very useful in a self-serve printing and processing apparatus where the operator will not be available to make the appropriate corrections or adjustments. Therefore, the present invention provides means for determining the operational effectiveness of various controllable operations.

Figure 6:
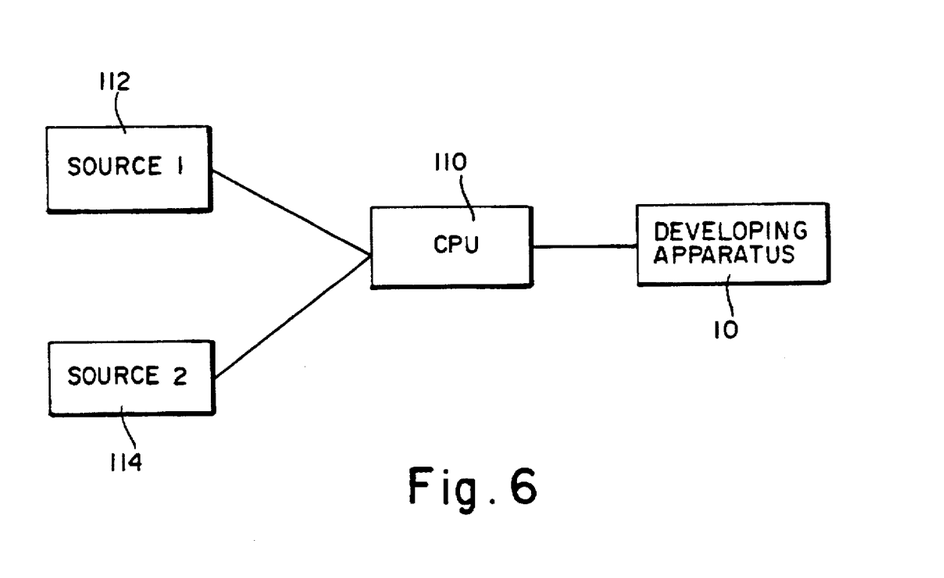
FIG. 6 is a flow diagram on how the apparatus of FIG. 1 interacts and obtains information from which prints are printed and processed through the apparatus.

Referring to FIG. 6, there is illustrated a flow diagram as to how the apparatus 10 obtains information for printing and processing. A central processing unit (CPU) 110, which is typically in the form of a personal computer, is provided to receive digital image record files from a plurality of digital sources 112,114. Sources 112,114 may be film scanners, flat bed scanners, computer files on floppy or portable hard disks, photo CDs, or other digital sources. An example of a suitable scanner is the Kodak Professional RFS 2035 scanner. The digital record file to be printed is forwarded from CPU 110 to the CPU 116 of the print section which is then forwarded to printhead assembly 48 (see FIG. 1) for exposing photosensitive material 22.

Referring to FIGS. 7, 8, 9, and 10, there is illustrated a modified developing section 14 including a modified processing section 50, dryer section 98, and a recirculation system 89 made in accordance with the present invention. In this embodiment, like numerals represent like parts and operation as previously described.

Figure 7:
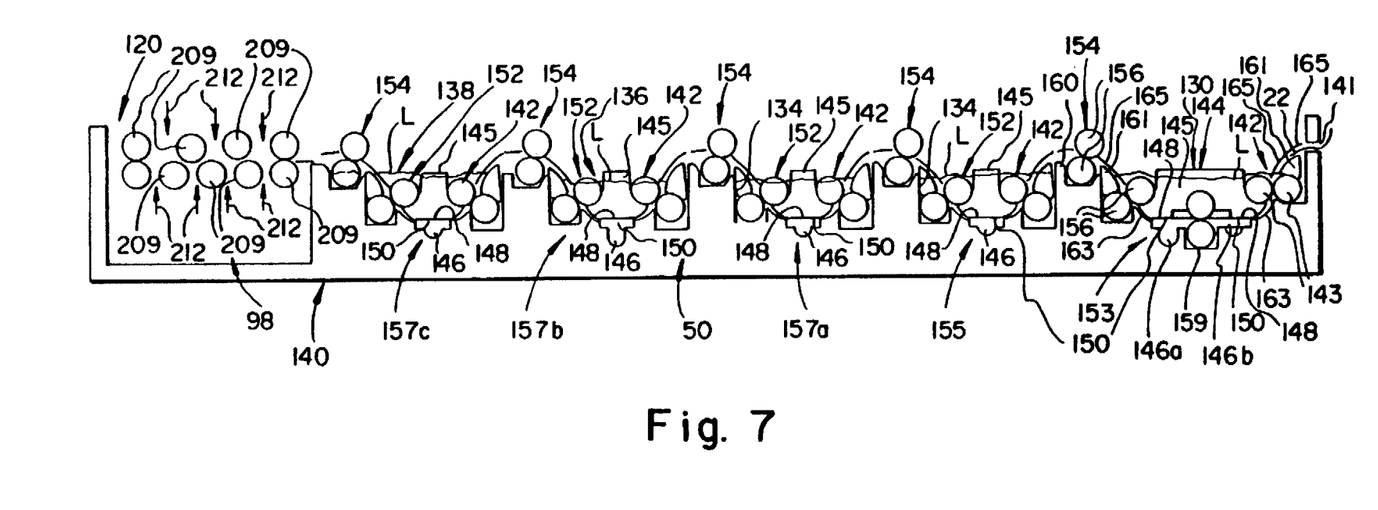
FIG. 7 is a cross-sectional view of a modified processing section and drying section of an apparatus made in accordance with the present invention.
Figure 8:
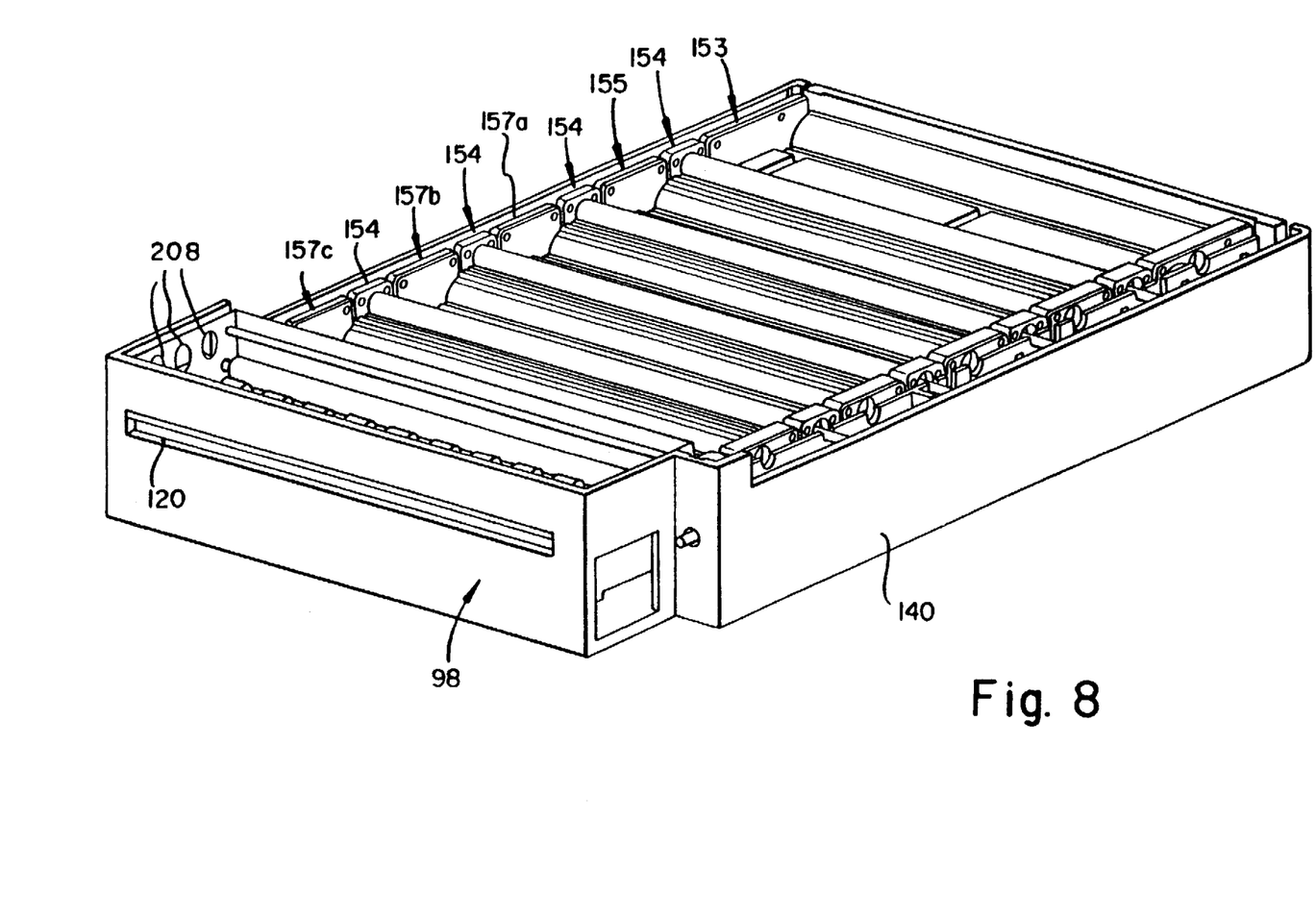
FIG. 8 is a perspective view of FIG. 7.
Figure 9:
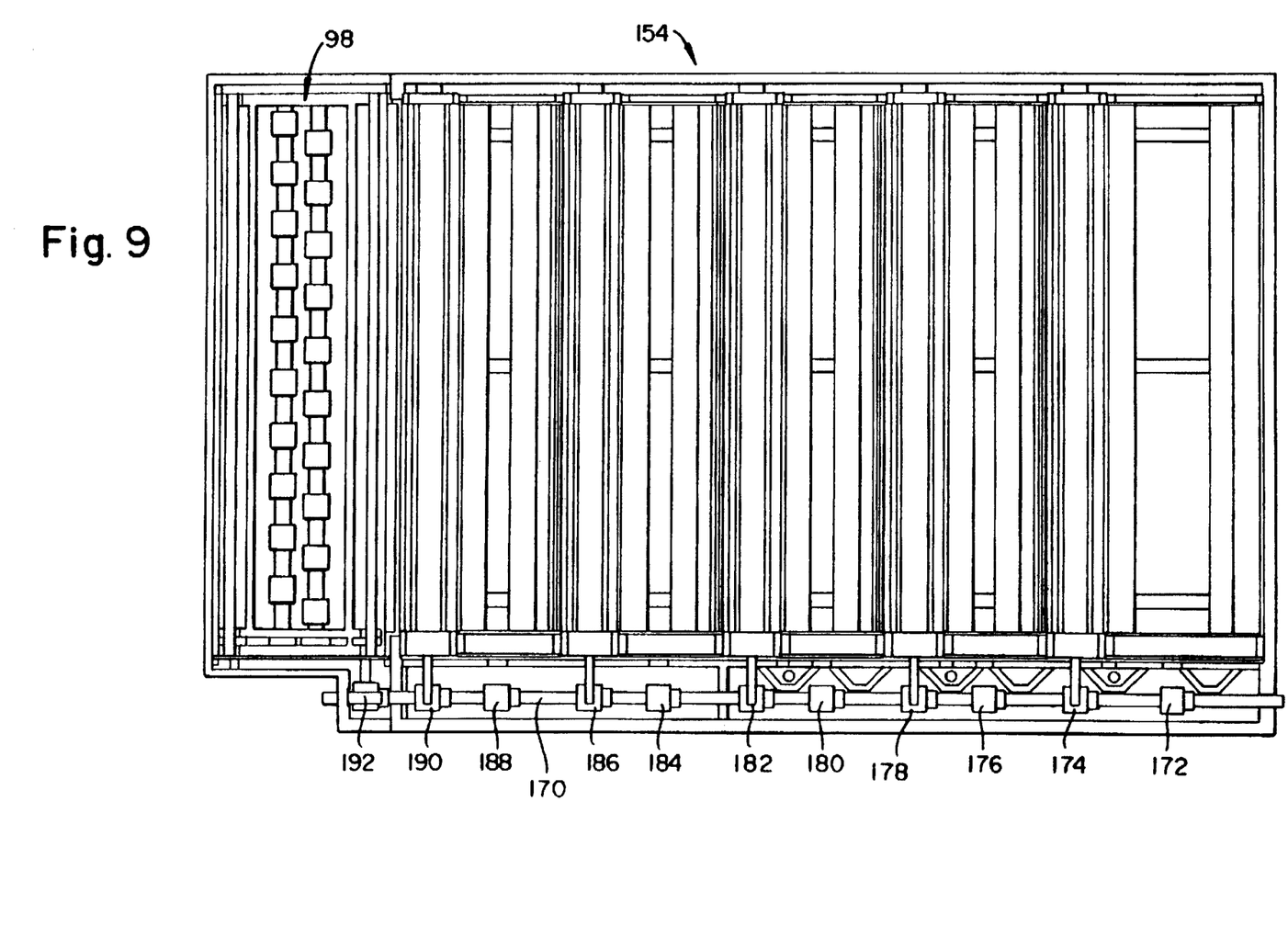
FIG. 9 is a top plan view of FIG. 8.

Referring to FIGS. 7, 8, and 9, there is illustrated processing section 50 and dryer section 98. In this embodiment the dryer section 98 is positioned horizontally adjacent processing section 50, thus allowing the photosensitive material 22 to exit horizontally from the printing and processing apparatus through exit port 120. In particular, there is provided processing modules 153,155,157a,157b,157c. Module 153 is a developing module which contains a developing processing solution for developing the photosensitive material; module 155 which contains a bleach fixing solution; and modules 157a,157b,157c which contain stabilizer wash solutions. The level of the processing solutions in each of the modules is indicated generally by the letter "L" as shown in FIG. 7. Each of the modules 153, 155,157a,157b,157c are received in well sections 130,132, 134,136,138 formed in container 140, respectively. The well sections are preferably integrally formed as a part of the container 140. The photosensitive material 22 enters the processing section 50 through opening 141 and is guided by guide roller assembly 142 having a pair of rollers 143, which passes the photosensitive material 22 through a nozzle assembly 144, which comprises an upper nozzle section 145 and a pair of lower nozzle sections 146a,146b. The upper and lower sections 145,146a,146b form a thin processing channel 147 for processing of the photosensitive material as it passes through the nozzle assembly 144. A pair of impingement slot nozzle openings 148 are provided in upper nozzle section 145, which are in alignment with a pair of slot nozzle openings 150 in lower nozzle sections 146a,146b. In the embodiment illustrated openings 148,150 each comprises a single elongated slot which extends across the width of the photosensitive material. However, the openings 148, 150 may comprise a plurality of openings disposed adjacent each other in any desired pattern. The slot nozzle openings 148,150 provide for the impingement of a photoprocessing solution against the photosensitive material passing through the channel 147 of nozzle assembly 144. While in the embodiment illustrated nozzle openings 148,150 are provided on both sides of the photosensitive material, only one of the slot nozzle openings 148,150, either in the top or bottom sections 145,146 may be provided so as to impinge the emulsion placed on either the top or bottom surface of the photosensitive material 22. A transport roller assembly 159 is provided for moving the photosensitive material 22 through nozzle assembly 144. Guide blocks 161, guide sections 163, and guide plates 165 provide a guide path for guiding the material 22. In the embodiment illustrated, guide blocks 161 are separate components which are secured to processing modules, whereas guide sections 163 may be formed as a part of the container 140. The guide plates 165 are secured to the apparatus 10 in any desired manner. The photosensitive material 22 exits the nozzle assembly 144, passes through transport roller assembly 152 to cross-over assembly 154, each cross-over assembly comprising a pair of transport rollers 156 wherein at least one roller is a drive roller. As can be seen, the cross-over assembly 154 is received in a well 160, sized and shaped so as to properly receive the cross-over assembly 154. Modules 153,155, 157a,157b,157c are similarly constructed as is module 153, like numerals indicating like parts. The only difference being in these particular modules is there is only a single opening 148,150 for impingement of the processing solution against the photosensitive material for that particular module. Likewise, a cross-over assembly 154 is provided between modules 153,155,157a,157b,157c and dryer section 98. In the particular embodiment illustrated, the nozzle assemblies and transport assemblies are all designed so they can be easily lifted out of the container 140, thus allowing easy access to all of the individual modules. Preferably, as illustrated, the developing section 14, which includes the processing section 50, recirculation system 89, and dryer section 98 are mounted to apparatus 10 such that it can slide outward in the direction indicated by arrow 171 in FIG. 10. This assists in providing easy access to the processing and dryer sections as required.

Referring to FIG. 9, there is illustrated a top plan view of the processing section 50 and dryer section 98. Rotational drive power for each of the transport rollers and cross-over assemblies 142,152,154,159 comes from shaft 170, which is mechanically coupled to each of the roller assemblies by known gear means, which in the particular embodiment are worm gears 172,174,176,178,180,182,184,186,188, 190, 192. There are no limits on the number of processing modules that can be employed, the sequence, or width of the modules. The particular size of the modules is selected in accordance with the size and type of photosensitive material to be processed.

Figure 10:
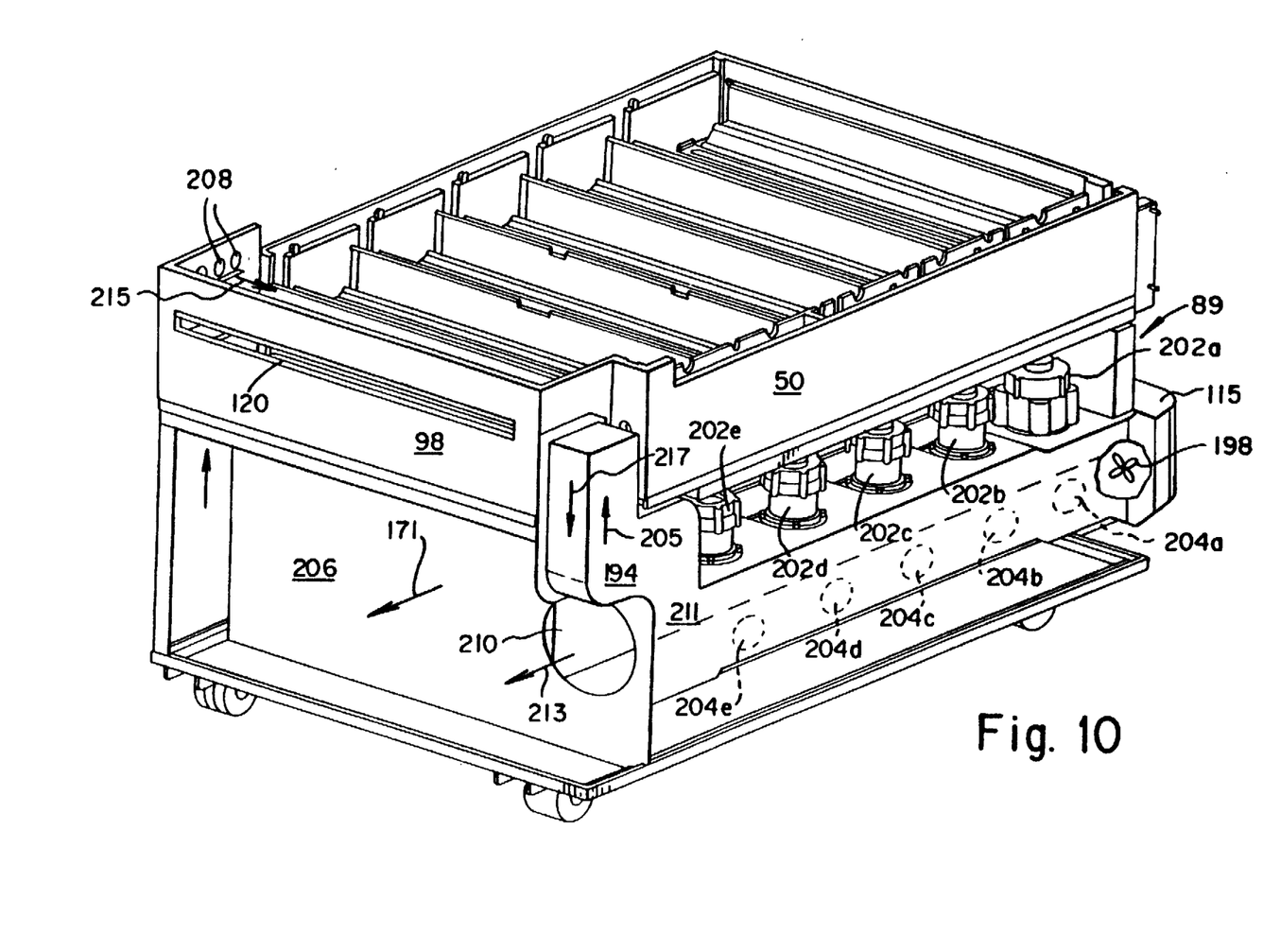
FIG. 10 is a perspective view of a modified developing section of an apparatus made in accordance with the present invention incorporating the drying section and processing section illustrated in FIGS. 7, 8, and 9.

Referring to FIG. 10, there is illustrated a perspective view of the developing section 14 of apparatus 10, and more particularly illustrating the processing section 50, drying section 98 and recirculation system 89. A heat duct 194 receives heated air from the electrical control box 115, which contains the electronics for operating the developing section 14 which includes CPU 106, via fan 198. The duct 194 also contains the motor for the recirculation pumps (not shown) used in the recirculation system 89. The central box 115 is preferably isolated from the recirculating system and includes a plurality of openings (not shown) for allowing fresh air to enter.

In low volume thin tank processors, since there is such a low volume of processing solution present in the apparatus, the processing solution is more subject to being affected by the ambient temperature and heat generated by the apparatus 10. Thus, it becomes more important in such processors to design the apparatus such that the processing solution passing through each of the modules be maintained at a relatively constant temperature. Thus, in the embodiment illustrated in FIG. 10, the heat generated by the recirculation pumps, and other heat generating devices that are present, are isolated from the recirculation system 89. In the particular embodiment illustrated, the pump motors are isolated from the pump heads (impellers) 202a,202b,202c,202d,202e. Since the pump motors are located in duct 194, they are substantially isolated from the remaining portion of the recirculating system 89. Inlet openings 204a,204b,204c,204d,204e are provided in duct 194 for allowing fresh circulating air to enter the duct 194 adjacent the pump motors which combines with the heat from the control box 105 and is forwarded on to the dryer section 98 to supplement the drying heat and also evacuate excess heat that may be generated by the apparatus. A small fan (not shown) may be placed adjacent openings 204 for drawing fresh air in through openings 204 and blowing it across the recirculation pumps. Preferably, appropriate filters are provided such that only filtered air enters duct 194 and is delivered to the drying section 98. In the embodiment illustrated, the motors have fans built integrally therewith. When the processing section 50 is in the standby mode, the excess heat that is generated by the pump motor, and electronics in box 115 will flow in the duct 194 as indicated by arrow 205 and enter the dryer section 98 and exit slot 120 through which the photosensitive material exits the apparatus. In this embodiment, heating elements (not shown) are provided in section 206 which heats the air for delivery to dryer section 98 through openings 208 which is then conveyed to nozzle assemblies (not shown) in dryer section 98. The nozzles deliver the heated air between drive rollers 209 as indicated by arrows 212. A dryer blower (not shown) is provided adjacent opening 210 for delivering air to the heating element (not shown) provided in section 206. This fan is of sufficient size and capacity to overpower the direction of air flow indicated by arrow 205 when the processing section 50 is in the active operational mode. Thus, the air flow will come from the lower portion 211 of duct 194 through opening 210 up to dryer section 98 (as indicated by arrows 213 and 215) and impinged on the photosensitive material as indicated by arrows 212. Some of the drying air will exit opening 120 while the majority of the drying air will be recirculated back into duct 194 (as indicated by arrow 217) which is then drawn back through opening 210.

It should be understood that the developing section, if desired, may be modified so as be a stand alone low volume thin tank type processor having all of the benefits of isolating the heat generating devices from the recirculating system disclosed herein.

The present invention provides a compact printing and processing apparatus wherein low volume utilization of photosensitive material can be provided without any significant effect to the chemistry therein. Also the apparatus can accommodate large sized prints and a wide variation in different widths and lengths of photosensitive materials while requiring a relatively small area. Additionally, the present invention provides an apparatus which is relatively inexpensive, reliable, easy to service, and produces high quality color images on photosensitive material.

It is to be understood that various changes and modifications can be made without departing from the scope of the present invention. The present invention being limited by the following claims.

Parts List

10 . . . apparatus
12 . . . printing section
14 . . . developing section
16 . . . rotary print system
18 . . . rotor
20 . . . print shoe
22 . . . photosensitive material
24 . . . roll
26 . . . magazine
27 . . . cutter
28 . . . guide rollers
30 . . . guide rollers
31 . . . inner surface
32 . . . guide rollers
34 . . . guide
38 . . . pedestal structure
40 . . . translator base
42 . . . leadscrew
44 . . . stepper motor
46 . . . coupler
48 . . . LED printhead assembly
50 . . . processing section
51 . . . container
52 . . . upturned entrance channel
53,55,57a,57b,57c . . . processing modules
54 . . . entry transport roller assembly
56 . . . transport roller assembly
58 . . . exit transport roller assembly
60 . . . upturned exit channel
62a,62b,62c . . . slot nozzle assemblies
64 . . . drive
66 . . . rotating assembly 70 ... top roller
72 ... bottom roller
74 ... tension springs
76 ... bearing bracket
78 ... top channel section
79 ... bottom channel section
80 ... processing channel
82 ... openings
84 ... intermeshing gears
86 ... openings
88 ... exit passages
89 ... recirculation system
90 ... replenishment section
94 ... effluent section
98 ... drying section
100 ... dryer
102 ... dryer blower
104 ... receiving tray
106,110,116 ... CPU
107 ... densitometer
109 ... exit port
112,114 ... digital sources
115 ... electrical control box
116 ... control unit
120 ... exit port
130,132,134,136,138 ... well sections
140 ... container
141 ... opening
142 ... guide roller assembly
143 ... rollers
144 ... nozzle assembly
145 ... upper nozzle section
146a,146b ... lower nozzle sections
147 ... processing channel
148 ... impingement slot nozzle openings
150 ... slot nozzle openings
152 ... transport roller assembly
155,157a,157b,157c ... processing modules
154 ... cross-over assembly
156 ... transport rollers
159 ... transport roller assembly
160 ... well
161 ... guide blocks
163 ... guide sections
165 ... guide plates
170 ... shaft
171 ... arrow
172,174,176,178,180,182,184,186,188,190,192 ... worm gears
194 ... heat duct
198 ... fan
202a,202b,202c,202d,202e ... pump heads (impellers)
204a,204b,204c,204d,204e ... inlet openings
205 ... arrow
206 ... section
208 ... openings
209 ... drive rollers
210 ... opening
211 ... lower portion
212,213,215,217 ... arrows

We claim:

1. A digital color printing and processing apparatus comprising:

a digital color printer for printing an image obtained from digital input signals onto a photosensitive material; and a developing section for processing the photosensitive material that has been passed through said digital printer, said developing section having a low volume thin channel processor for processing the photosensitive material.

2. A digital printer and processing apparatus comprising:

a) a digital LED printer for printing an image obtained from digital input signals onto a photosensitive material; and b) a developing section for processing said photosensitive material that has been passed through said digital printer, said developing section having a low volume thin channel processor for processing photosensitive material.

3. A digital color printing and processing apparatus for photosensitive materials comprising:

a) a digital printer having an LED printhead for printing of an image obtained from digital input signals onto a photosensitive material, and a generally cylindrical shoe having an inner surface for receiving the photosensitive material on its inner surface;

b) a supply of photosensitive material for feeding to the digital printer; and c) a processor for processing the photosensitive material that has been printed by said digital LED printer, said processor being disposed directly below said printer and having at least one processing module for applying a processing solution to the photosensitive material, said at least one module comprising a container, at least one processing assembly placed in said container, and at least one transport assembly disposed adjacent said at least one processing assembly, said at least one processing assembly and said at least one transport assembly forming a substantially continuous processing channel through which a processing solution flows, said processing channel comprising of at least 40% of the total volume of the processing solution available for processing photosensitive material and having a thickness equal to or less that about 100 times the thickness of the photosensitive material to be processed in said processing channel, at least one discharge opening being provided in said at least one transport assembly for introducing processing solution to said processing channel, and means for circulating the processing solution from said small volume provided in said module directly to said at least one discharge opening.

4. A digital printing and processing apparatus according to claim 3 wherein said supply of photosensitive material comprises a roll of photosensitive material.

5. The apparatus claimed in claim 3 wherein said at least one discharge opening has a configuration in accordance with the following relationship:

$$1 \leq F/A \leq 40$$

wherein:

F is the flow rate of the solution through the nozzle in gallons per minute; and A is the cross-sectional area of the nozzle provided in square inches.

6. A digital color printing and processing apparatus for photosensitive material comprising:

a digital printer having an LED printhead for printing of an image obtained from digital input signals onto a photosensitive material, a generally cylindrical shoe having an inner surface for receiving a photosensitive material on its inner surface, a supply roll of photosensitive material for delivering the photosensitive material to said shoe;

a processor for processing the photosensitive material that has been printed by said digital printer, said processor having at least one processing module, said at least one processing module comprising a container and at least one processing assembly placed in said container, said container and said at least one processing assembly forming a processing channel through which a processing solution flows, said processing channel having an entrance and an exit, said at least one processing assembly having a discharge opening for delivering processing solution to said processing channel, the processing channel comprising at least 40% of the total volume of the processing solution available for the processing section and having a thickness equal to or less than about 100 times the thickness of the photosensitive material to be processed in said processing channel, and means for circulating the processing solution through said processing section.

7. A digital color printing and processing apparatus comprising:

a digital color printer for printing an image obtained from digital input signals onto a photosensitive material;

a processing section for processing said photosensitive material that has been passed through said digital printer, said processing section having a low volume thin processing channel for processing the photosensitive material; and self-determining means for determining operational effectiveness of at least one controllable operation.

8. The apparatus according to claim 7 wherein said self-determining means comprises a densitometer and means for printing a calibration exposure onto the photosensitive material.

9. The apparatus according to claim 7 wherein said at least one controllable operation is the rate and/or amount at which replenishment solution is being supplied to the processor.

10. The apparatus according to claim 7 wherein said at least one controllable operation is the image signal being supplied to the printhead for printing the images onto the photosensitive material.

11. A method of printing and processing a color photosensitive material in a printing and processing apparatus having a digital printer for printing an image obtained from digital input signals onto the photosensitive material and a processor for processing photosensitive material, said processing section comprising a low volume thin chamber through which the photosensitive material is passed for processing, said printer having a continuous supply roll of photosensitive material for providing photosensitive material in said printing section for digital printing of an image thereon, comprising the steps of:

a) writing at least one image on said photosensitive material by said printer; and b) processing said at least one image of said photosensitive material in said processing section.

12. A method of printing and processing a color photosensitive material in a printing and processing apparatus having a digital printer for printing an image obtained from digital input signals onto the photosensitive material and a processor for processing photosensitive material, said processing section comprising a low volume thin chamber through which the photosensitive material is passed for processing, said printer having a continuous supply roll of photosensitive material for providing photosensitive material in said printing section for digital printing of an image thereon, comprising the steps of:

a) writing a plurality of images on said photosensitive material by said printer; and b) processing said photosensitive material in said processing section.

13. A method according to claim 12 wherein said plurality of images are provided in collage form.

14. A method according to claim 12 further comprising the steps that said plurality of images are efficiently oriented on said photosensitive material so as to make more efficient use of photosensitive material.

15. A method according to claim 12 further comprising the steps of adding text and/or graphic to the photosensitive material being printed.

16. A digital color printing and processing apparatus comprising:

a digital color printer for printing an image onto a photosensitive material; and a developing section for processing the photosensitive material that has been passed through said digital printer, said developing section having a low volume thin channel processor for processing the photosensitive material, said processor having a recirculating system, and isolating means for isolating any heat generating portion of the recirculating system from the recirculating means.

17. A processor for processing a photosensitive material comprising:

at least one processing module for applying a processing solution to a photosensitive material, said at least one processing module comprising a container and at least one processing assembly placed in said container, said container and said at least one processing assembly forming a processing channel through which a processing solution flows, said processing channel having an entrance and an exit, said at least one processing assembly having a discharge opening for delivering processing solution to said processing channel, the processing channel comprising at least 40% of the total volume of the processing solution available for the processing section and having a thickness equal to or less than about 100 times the thickness of the photosensitive material to be processed in said processing channel, means for circulating the processing solution through said processing section, said circulating means having at least one pump motor for circulating the processing solution, and means for isolating the pump motor from the remaining portion of said circulating means so as to minimize transfer of heat generated by said pump motor to said circulating system.

18. A processor according to claim 17 further comprising a dryer section for drying of said photosensitive material which has passed through said processing module, said isolating means comprising a duct in which said at least one pump motor is located, said duct being connected to a dryer section.

19. A processor according to claim 18 further comprising electrical control for controlling operation of said processor, said electrical control generating heat and being placed within a control box which is connected to said duct so that air can flow from said control box into said duct.

20. A processor according to claim 19 further comprising means for drawing fresh air into said control box or said duct.

21. A processor according to claim 20 wherein said means for drawing fresh air into said control box comprises openings.

22. A digital color printing and processing apparatus for photosensitive material comprising:

a digital printer having an LED printhead for printing of an image onto a photosensitive material, a generally cylindrical shoe having an inner surface for receiving a photosensitive material on its inner surface, a supply roll of photosensitive material for delivering the photosensitive material to said shoe;

a processor for processing the photosensitive material that has been printed by said digital printer, said processor having at least one processing module, said at least one processing module comprising a container and at least one processing assembly placed in said container, said container and said at least one processing assembly forming a processing channel through which a processing solution flows, said processing channel having an entrance and an exit, said at least one processing assembly having a discharge opening for delivering processing solution to said processing channel, the processing channel comprising at least 40% of the total volume of the processing solution available for the processing section and having a thickness equal to or less than about 100 times the thickness of the photosensitive material to be processed in said processing channel, means for circulating the processing solution through said processing section, said circulating means having at least one pump motor for circulating said processing solution, and isolating means for isolating the pump motor from the remaining portion of said circulating means.

23. A processor for processing a photosensitive material comprising:

at least one processing module for applying a processing solution to a photosensitive material, said at least one processing module comprising a container and at least one processing assembly placed in said container, said container and said at least one processing assembly forming a processing channel through which a processing solution flows, said processing channel having an entrance and an exit, said at least one processing assembly having a discharge opening for delivering processing solution to said processing channel, the processing channel comprising at least 40% of the total volume of the processing solution available for the processing section and having a thickness equal to or less than about 100 times the thickness of the photosensitive material to be processed in said processing channel, means for circulating the processing solution through said processing section, said circulating means having at least one pump motor for circulating the processing solution;

a dryer for drying the photosensitive material that has been processed by said at least one processing module, said dryer having a drying section through which the photosensitive material passes, including an entrance and an exit, a heating section having heating means for heating air, and a blower for delivering air to said heating section and to said drying section;

means for isolating the pump motor from the remaining portion of said circulating means so as to minimize transfer of heat generated by said pump motor to said circulating system, said isolating means comprising a duct which isolates the pump motor, said duct being in fluid communication with the inlet of said blower for delivering air to said heating section, said duct also being in direct communication with said drying section so that when said processor is in the standby mode, heated air in said duct will be directed to said drying section, said blower when in the operation state draws air into said heating section, into said drying section, to the upper portion of said duct and back to said blower motor.

24. A processor for processing a photosensitive material comprising:

a processor having at least one processing assembly forming a processing channel through which a processing solution flows, said processing channel having an entrance and an exit, said processing assembly having a discharge opening for delivering processing solution to said processing channel, the processing channel comprising at least 40% of the total volume of the processing solution available for the processing section and having a thickness equal to or less than about 100 times the thickness of the photosensitive material to be processed in said processing channel, means for circulating the processing solution through said processing section, said circulating means having at least one pump motor for circulating the processing solution;

a dryer for drying the photosensitive material that has been processed by said at least one processing module, said dryer having a drying section through which the photosensitive material passes, including an entrance and an exit, a heating section having heating means for heating air, and a blower for delivering air to said heating section and to said drying section;

means for isolating the pump motor from the remaining portion of said circulating means so as to minimize transfer of heat generated by said pump motor to said circulating system, said isolating means comprising a duct which isolates the pump motor, said duct being in fluid communication with the inlet of said blower for delivering air to said heating section, said duct also being in direct communication with said drying section so that when said processor is in the standby mode, heated air in said duct will be directed to said drying section, said blower when in the operation state draws air into said heating section, into said drying section, to the upper portion of said duct and back to said blower motor.

\* \* \* \* \*